3,155,831
PROTECTIVE SYSTEM FOR PHOTO-RESPONSIVE UNITS

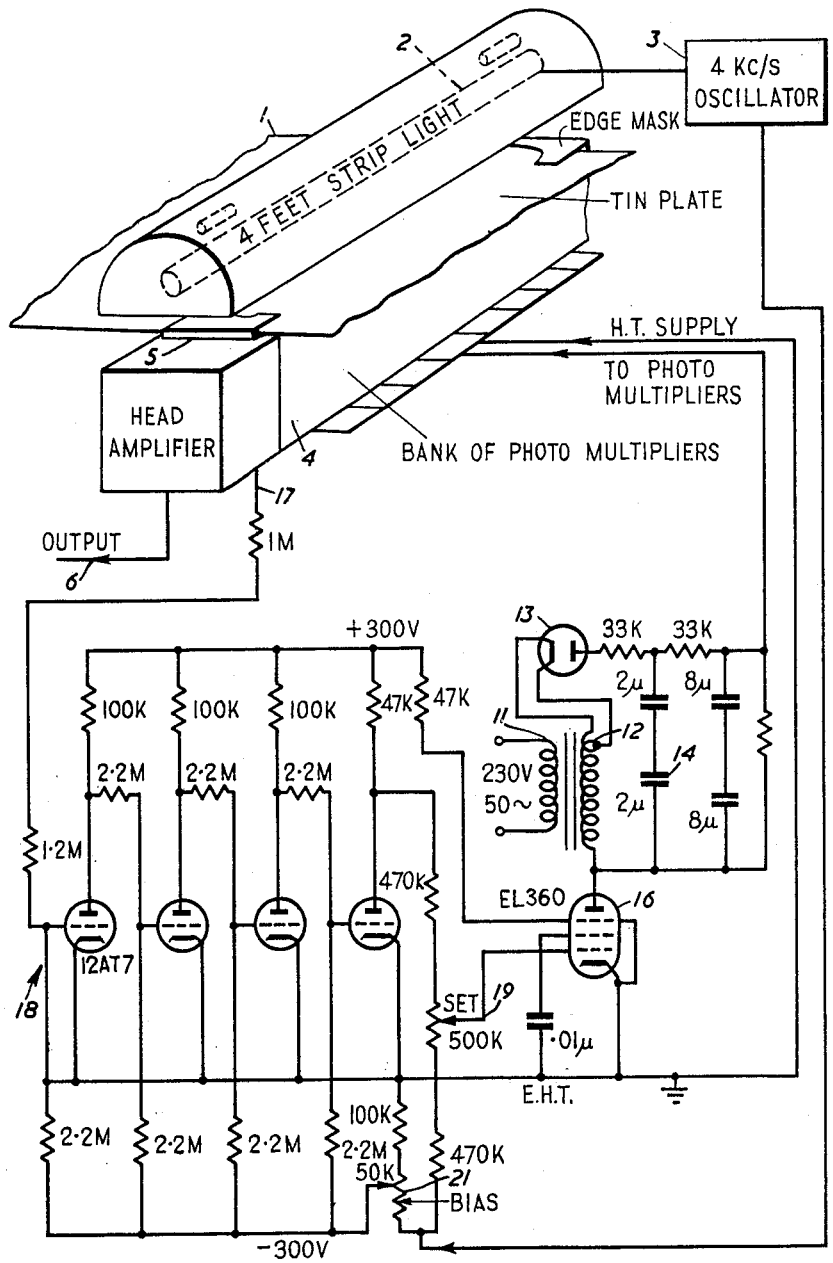

David Goodwin, Edinburgh, and Robert Lightbody Dobbie, Shotts, Scotland, assignors to Bruce Peebles & Co., Limited, Edinburgh, Scotland, a company of Great Britain
Filed Feb. 16, 1961, Ser. No. 89,790
Claims priority, application Great Britain, Feb. 23, 1960, 6,372/60
16 Claims. (Cl. 250—207)

This invention relates to photo-responsive units for example for use in inspection devices in which a unit can be illuminated from a light source, and is particularly but not exclusively applicable to such an inspection device, arranged to detect holes in sheet material, for example metal, in which the light source is on one side of the sheet and the photo-responsive unit is on the other side to be excited from the source through any holes if such are present in the sheet.

Photo-electric devices may be damaged if they are subjected to excessive illumination, for example such as would occur if a large rent were to appear in the sheet material, or if as often happens, a portion were cut-out from the sheet for use as a metallurgical specimen.

One object of the invention is to protect a photo-responsive unit from damage due to excess of exciting light and according to the invention, a protective system includes a source of H.T. potential for the unit and an electrically controlled switch arranged to reduce or remove the H.T. potential in response to an increase in the output from the unit beyond a pre-determined level, in which a circuit controlling the switch has a time constant which is not due to lumped capacitance or inductance and in which the charge on capacitors in the H.T. potential source is not changed substantially by the switching.

The expression "lumped capacitance" includes capacitance due to components used because of their capacitance effect and is to be distinguished from stray capacitance which is unavoidable.

Thus the H.T. source may include one or more smoothing capacitors connected across a rectified A.C. source and then the switch may be connected in series between the smoothed voltage terminals and the photo-responsive unit so that operation of the switch does not disconnect the smoothing capacitors from the A.C. source.

The only capacitance in the control circuit will be due to stray capacitance and conveniently the control circuit has a direct coupled amplifier connected between the output from the unit and a control for the switch, which switch may comprise a grid-controlled electronic valve or transistor.

It follows that safety precautions can be promptly taken when excessive illumination occurs and that when the danger is past, the unit can be quickly restored to its sensitive condition for inspection.

The invention may be carried into practice in various ways and one embodiment will now be described by way of example as applied to a photo-electric inspection mechanism for detecting pinholes or other faults in sheet tin plate as it is manufactured.

In the accompanying drawing the single figure is a schematic diagram of the detecting apparatus and includes a circuit diagram of the electrical system for supplying H.T. power to the photo-electric unit.

As the tin plate 1 is fed from a machine it passes between a strip light 2 energised from a 4 k.c/s. oscillator 3 and a photo-electric detector unit 4 comprising a bank of nine photo-multipliers uniformly spaced over the width of the tin plate 1. Edge masks 5 are for eliminating leakage of light around the edges of the tin plate and the intention is that if any photo-multiplier is illuminated it must be from the strip light 2 through a pinhole or a tear in the tin plate.

When this occurs an output appears at 6 and this can be used to give an indication that a fault is present at the particular position along the length of the tin plate.

The photo-multipliers are required to be sensitive to the light passing through a pin hole which is 0.0005" in diameter but it is possible that a longitudinal tear or the cut-out where a piece of tin plate has been removed as a metallurgical specimen will cause excessive illumination of one or more of the photo-multipliers. Such illumination could temporarily or permanently damage the multiplier concerned, for example by causing it to lose its emission and accordingly it is necessary to provide some protection to prevent such serious consequences.

It is arranged that when excessive illumination occurs and is recognised as an increase in the output voltage at 6 above a pre-determined value the H.T. supply to the photo-multipliers is reduced or removed so that in spite of the increased illumination the photo-multipliers concerned do not pass an excessive current.

The H.T. supply is derived from an A.C. supply 11 through a transformer 12 and a diode rectifier 13 and this H.T. supply is smoothed by a number of shunt capacitors 14. One of the shut arms has a capacitance of 4 micro-farads and if the connection between the A.C. source 11 and the smoothing capacitors 14 were broken whenever it was required to reduce the sensitivity of the multipliers in response to excessive illumination, the time taken to reduce the supply and also the time taken to restore it after the fault had passed would depend upon the discharging and charging time of the capacitors 14 and could be quite excessive. For example, if the time constant of the circuit were the equivalent of a time greater than two or three milli-seconds not only would the supply be reduced so slowly that damage might have occurred to one of the multipliers before the supply was fully removed, but also an appreciable length of tin plate might have passed the detector before the supply was restored and this length of tin plate would have to be rejected because it had not been inspected by a fully-sensitive detector.

In order to avoid this difficulty the smoothed H.T. supply is connected to the photo-multipliers in series with an electronic switch comprising a pentode valve 16 and this valve can be controlled by a signal applied to its control grid to be effectively cut-off so that the H.T. supply is removed from the photo-multipliers.

The signal for the control grid of the pentode 16 is derived from the output 6 of the detector 4 through a connection 17 which is made to the input of a four-stage direct-coupled amplifier 18 whose output is connected to the control grid of the pentode 16 through a potentiometer 19 which enables the normal value of the H.T. supply to be set as desired. The D.C. amplifier 18 includes a potentiometer 21 for setting the limit corresponding to the output signal from the detector at which the H.T. supply is to be cut-off. It is clear that if the output voltage of the oscillator 3 were to increase, the illumination of the light 2 would also increase and so would the output from the photo multipliers 4 due to any light passing the plate. In order that this change in the photo multiplier output shall not cause a false operation of the pentode switch 16, the oscillator voltage is also connected to one end of the bias potentiometer 21 to adjust the bias on the control electrode of the pentode 16 to prevent such false operation.

It will be observed that the amplifier 18 contains no lumped capacitors or inductors in the signal path, and since the total capacitance will be merely that due to such stray capacitance as occurs, the time constant of the circuit will be very small. It is found that if the output from the detector amplifier rises above the predetermined limit the pentode can be cut-off within less than one millisecond to remove the H.T. supply from the photo-multipliers. Similarly because the capacitors 14 do not have to be recharged and because the time constant of the direct-coupled amplifier 18 is low, when the excessive illumination is over, the H.T. supply can be restored as quickly as it was removed so that the detector is ready to respond to a pin hole occurring only a little beyond the fault which caused the excessive illumination.

The arrangement has the advantage that it is also responsive to changes in ambient light which could damage the photo-multipliers even if the light 2 were switched off. This is because the protective system works in response to the D.C. level of the output from the photo-multiplier bank where an excessive output will appear if any one of the photo-multipliers tries to pass a damaging current. Of course, the protective system will operate if all of the multipliers tried to pass a signal greater than one ninth of the limiting current but if this were to occur it would be desirable in any case that a fault should be indicated.

What we claim as our invention and desire to secure by Letters Patent is:

1. A protective system for a photo-responsive unit including a source of potential for the unit, capacitance in the potential source, an electrically-controlled switch connected between the potential source, including the capacitance, and the photo-responsive unit to remove the potential from the unit, and a circuit connected to the switch for controlling the switch, said circuit comprising resistance and only stray capacitance whereby a very small time constant is maintained which is due substantially to resistance.

2. A protective system for a photo-responsive unit including a source of potential for the unit, capacitance in the potential source, an electrically-controlled switch connected between the potential source, including the capacitance, and the photo-responsive unit to remove the potential from the unit, a circuit connected to the switch for controlling the switch, said circuit comprising resistance and only stray capacitance whereby a very small time constant is maintained which is due substantially to resistance and means responsive to an increase in the output from the unit beyond a pre-determined level for controlling the switch.

3. A protective system for a photo-responsive unit including a source of H.T. potential for the unit, capacitance in the potential source, an electrically-controlled switch connected between the potential source, including the capacitance, and the photo-responsive unit to remove the potential from the unit, a circuit connected to the switch for controlling the switch, said circuit comprising means producing a time constant of less than one milli-second, and means responsive to an increase in the output from the unit beyond a pre-determined level for controlling the switch.

4. A system as claimed in claim 2 in which the source of potential includes a rectified A.C. source, and smoothing capacitance connected across it.

5. A system as claimed in claim 4 in which the switch is connected in series between the output of the smoothing capacitance and the photo-responsive unit.

6. A system as claimed in claim 1 in which the circuit is a direct-coupled circuit.

7. A system as claimed in claim 2 in which the circuit includes a direct-coupled amplifier connected between the means responsive to the output from the photo-responsive unit and the control for the switch.

8. A system as claimed in claim 1 in which the switch comprises a grid-controlled electronic device.

9. A system as claimed in claim 2 including an electric lamp for exciting the photo-responsive unit, an electric supply for said lamp, and a connection from the lamp supply to the means responsive to the output from the unit, arranged to adjust the predetermined level of the output from the unit in partial compensation for a change in output due to a change in lamp supply voltage.

10. A protective system for a photo-responsive unit including a source of H.T. potential for the unit, capacitance in the potential source, an electrically-controlled switch connected between the potential source, including the capacitance, and the photo-responsive unit to remove the potential from the unit, and a circuit connected to the switch for controlling the switch, said circuit comprising means producing a time constant of less than one milli-second.

11. A system as claimed in claim 3 in which the source of potential includes a rectified A.C. source, and smoothing capacitance connected across it.

12. A system as claimed in claim 11 in which the switch is connected in series between the output of the smoothing capacitance and the photo-responsive unit.

13. A system as claimed in claim 10 in which the circuit is a direct-coupled circuit.

14. A system as claimed in claim 3 in which the circuit includes a direct-coupled amplifier connected between the means responsive to the output from the photo-responsive unit and the control for the switch.

15. A system as claimed in claim 10 in which the switch comprises a grid controlled electronic device.

16. A system as claimed in claim 3 including an electric lamp for exciting the photo-responsive unit, an electric supply for said lamp, and a connection from the lamp supply to the means responsive to the output from the unit, arranged to adjust the predetermined level of the output from the unit in partial compensation for a change in output due to a change in lamp supply voltage.

References Cited in the file of this patent

UNITED STATES PATENTS

| | | |
|---|---|---|
| 2,833,937 | Cox | May 6, 1958 |
| 2,846,591 | Valeton | Aug. 5, 1958 |
| 2,958,785 | Camp | Nov. 1, 1960 |